United States Patent
Olah (10) Patent No.: US 10,431,998 B2
(45) Date of Patent: *Oct. 1, 2019

(54) SUB FOR A PIPE ASSEMBLY AND SYSTEM AND METHOD FOR USE OF SAME

(71) Applicant: Laslo Olah, Richardson, TX (US)

(72) Inventor: Laslo Olah, Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/862,725

(22) Filed: Jan. 5, 2018

(65) Prior Publication Data

US 2018/0316202 A1    Nov. 1, 2018

Related U.S. Application Data (63) Continuation-in-part of application No. 15/485,349, filed on Apr. 12, 2017, now Pat. No. 10,008,867,
(Continued)

(51) Int. Cl.
*H04M 1/02* (2006.01)
*H02J 7/00* (2006.01)
(Continued)

(52) U.S. Cl.
CPC ............ *H02J 7/0027* (2013.01); *H02J 7/007* (2013.01); *H02J 7/0044* (2013.01);
(Continued)

(58) Field of Classification Search
CPC ....... H04W 4/02; H04W 64/00; H04W 80/00; H04W 4/025
(Continued)

(56) References Cited

U.S. PATENT DOCUMENTS

| | | |
|---|---|---|
| 4,126,822 A | 11/1978 | Wahlstrom |
| 4,373,582 A | 2/1983 | Bednar et al. |
| (Continued) | | |

FOREIGN PATENT DOCUMENTS

| | | |
|---|---|---|
| CN | 203377111 | 1/2014 |
| WO | 2015154050 | 10/2015 |

OTHER PUBLICATIONS

International Searching Authority, International Search Report, PCT/US2015/024376, dated Jul. 6, 2015.
(Continued)

*Primary Examiner* — Sam Bhattacharya
(74) *Attorney, Agent, or Firm* — Scott T. Griggs; Griggs Bergen LLP (57) ABSTRACT

A sub for a pipe assembly and system and method for use of the same are disclosed. In one embodiment, the sub includes a mandrel having a body section including an internal flow passage that extends generally axially through the mandrel from an upper connection end to a lower connection end. A battery charger is located within a recessed region within the mandrel. Capacitors include opposing spaced plates having contact segments thereon. An output power increasing, electrically resistive fluid is held within and partially fills an enclosed chamber. In response to movement of the sub, induced relative motion between the output power increasing, electrically resistive fluid and contact segments varies the fluid-contact segment contact within the enclosed chamber, thereby generating an electrical charge. An electronic circuit, which is coupled to the opposing spaced plates, is configured to transfer the electrical charge to a battery associated with the mandrel.

19 Claims, 4 Drawing Sheets

Related U.S. Application Data which is a continuation-in-part of application No. 15/346,425, filed on Nov. 8, 2016, now Pat. No. 9,847,659, which is a continuation of application No. 14/972,841, filed on Dec. 17, 2015, now Pat. No. 9,491,271, which is a continuation-in-part of application No. PCT/US2015/024376, filed on Apr. 3, 2015.

(60) Provisional application No. 62/563,311, filed on Sep. 26, 2017, provisional application No. 61/995,159, filed on Apr. 3, 2014.

(51) Int. Cl.
*H04B 1/3816* (2015.01)
*H02N 1/04* (2006.01)
*H02J 7/34* (2006.01)
*H02J 7/32* (2006.01)

(52) U.S. Cl.
CPC .............. *H02J 7/0052* (2013.01); *H02J 7/32* (2013.01); *H02J 7/34* (2013.01); *H02N 1/04* (2013.01); *H04B 1/3816* (2013.01); *H04M 1/0262* (2013.01); *H02J 7/0042* (2013.01); *Y02B 40/90* (2013.01)

(58) Field of Classification Search
USPC .......................... 455/550.1, 571–573, 575.1
See application file for complete search history.

(56) References Cited

U.S. PATENT DOCUMENTS

| | | |
|---|---|---|
| 6,429,787 B1 | 8/2002 | Pyne |
| 6,956,791 B2 | 10/2005 | Dopf et al. |
| 7,898,096 B1 | 3/2011 | Krupenkin |
| 7,980,331 B2 | 7/2011 | Hall et al. |
| 8,899,347 B2 | 12/2014 | Sarhad et al. |
| 9,491,271 B2 | 11/2016 | Olah et al. |
| 2001/0049049 A1 | 12/2001 | Hensley et al. |
| 2004/0251048 A1 | 12/2004 | Kurkoski |
| 2006/0077762 A1 | 4/2006 | Boland et al. |
| 2015/0207360 A1 | 7/2015 | Adams et al. |
| 2015/0216273 A1* | 8/2015 | Akin ..................... A45B 25/00 135/16 |

OTHER PUBLICATIONS

International Searching Authority, International Search Report, PCT/US2016/059946, dated Jan. 12, 2017.

\* cited by examiner

SUB FOR A PIPE ASSEMBLY AND SYSTEM AND METHOD FOR USE OF SAME

PRIORITY STATEMENT & CROSS-REFERENCE TO RELATED APPLICATIONS

This application claims benefit priority from U.S. Provisional Patent Application No. 62/563,311, entitled "Sub for a Pipe Assembly and System and Method for Use of Same" and filed on Sep. 26, 2017, in the name of Laslo Olah. This application is also a continuation-in-part of co-pending U.S. patent application Ser. No. 15/485,349 entitled "Battery Charger for Electronic Devices and Electronic Device Using the Same" filed on Apr. 12, 2017, in the names of Laslo Olah et al; which is a continuation-in-part of U.S. patent application Ser. No. 15/346,425 entitled "Battery Charger for Electronic Devices and Electronic Device Using the Same" filed on Nov. 8, 2016, in the names of Laslo Olah et al and issued on Dec. 19, 2017 as U.S. Pat. No. 9,847,659; which is a continuation of U.S. patent application Ser. No. 14/972,841 entitled "Battery Charger for Portable Electronic Devices and Portable Electronic Device Using the Same" filed on Dec. 17, 2015, in the names of Laslo Olah et al and issued on Nov. 8, 2016 as U.S. Pat. No. 9,491,271; which is a continuation-in-part of Application No. PCT/US2015/024376 entitled "Battery Charger for Portable Electronic Devices and Portable Electronic Device Using the Same" filed on Apr. 3, 2015, in the names of Laslo Olah et al; which claims priority from U.S. Patent Application Ser. No. 61/995,159 entitled "Battery Charger for Portable Electronic Devices" filed on Apr. 3, 2014 in the name of Laslo Olah; all of which are hereby incorporated by reference for all purposes.

TECHNICAL FIELD OF THE INVENTION

This invention relates, in general, to pipe assemblies and, more particularly, to a sub for a pipe assembly and system and method for use of the same that provide battery capacity applicable to various oil field operations such as drill strings with downhole electronics.

BACKGROUND OF THE INVENTION

Electronics in oil field operations are often located in subs and the like and rely on a storage battery for operating power. Since the physical dimensions within a sub are limited, access to a sub is difficult, and conditions at the sub with respect to heat and pressure extreme, battery capacity is often strained. Accordingly, there is a need for enhanced systems and methods for providing improved battery capacity.

SUMMARY OF THE INVENTION

It would be advantageous to improve battery capacity in pipe assembly components, such as subs. It would also be desirable to enable a mechanical-to-electrical conversion solution that would convert motion to electrical energy, which would be thereafter be transferred to the battery in the sub, thereby enhancing battery capacity. To better address one or more of these concerns, a sub for a pipe assembly, such as a drill string, and system and method for use of the same are disclosed. In one embodiment of the sub, the sub includes a mandrel having a body section including an internal flow passage that extends generally axially through the mandrel from an upper connection end to a lower connection end. A battery charger is located within a recessed region within the mandrel.

Capacitors, which may be supercapacitors, are located within the battery charger and each of the pair of capacitors includes opposing spaced plates having contact segments thereon. An output power increasing, electrically resistive fluid is held within and partially fills an enclosed chamber that is boundaried by the contact segments. In response to movement of the sub, such as rotational, vibrational, or linear movement during a drilling operation, induced relative motion between the output power increasing, electrically resistive fluid and contact segments varies the fluid-contact segment contact within the enclosed chamber, thereby inversely alternating the capacitance between the pair of capacitors and triboelectrically generating an electrical charge. An electronic circuit coupled to the opposing spaced plates is configured to transfer the electrical charge to a battery associated with the mandrel. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
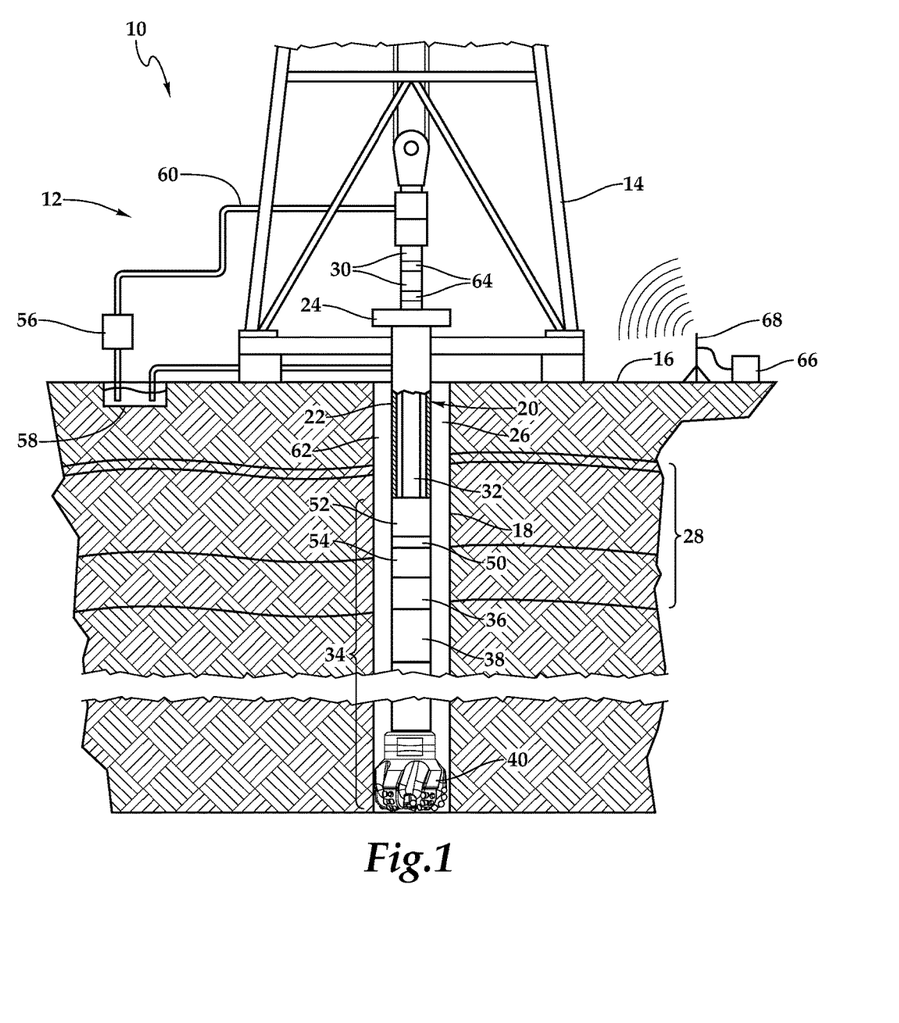
FIG. 1 is a schematic illustration of one embodiment of a system for drilling operations utilizing a sub in a pipe assembly, according to some teachings presented herein.

Referring initially to FIG. 1, therein is depicted one embodiment of a system for utilizing a sub for a pipe assembly, which is schematically illustrated and designated 10. The system 10 being employed within drilling operation 12 includes a drilling rig 14 located at a surface 16 of a well 18. The drilling rig 14 provides support for a pipe assembly 20 depicted as a drill string 22. As shown, the drill string 22 penetrates a rotary table 24 for drilling a borehole 26 through subsurface formations 28. The drill string 22 includes a kelly 30, a drill pipe 32 and a bottom hole assembly 34. By way of example, the bottom hole assembly 34 may include a drill collar 36, a downhole tool 38, and a drill bit 40. Additionally, the bottom hole assembly 34 may include one or more subs, such as sub 50, which is located between pipe assemblies 52, 54.

During drilling operations, the drill string 22 may be rotated by the rotary table 24. In some implementations, the bottom hole assembly 34 may also be rotated by a downhole motor. Also during drilling operations, a mud pump 56 may pump drilling fluid from a mud pit 58 through a hose 60 into the drill pipe 32 down to the drill bit 40. The drilling fluid can flow out from the drill bit 40 and return to the surface 16 through an annular area 62 between the drill pipe 22 and the sides of the borehole 26. The drilling fluid may then be returned to the mud pit 58, where the drilling fluid is filtered. An instrument hub 64 is integrated into the drill string 22 and coupled to the kelly 30. In some embodiments, the instrument hub 64 may include transceivers for communications with electronics, such as downhole instrumentation. The system 10 also includes a ground station 66 having an antenna 68 to provide wireless communications with the instrument hub 64.

The drill string 22, including the sub 50, may include different electronics positioned therein which provide control or monitor different downhole parameters, such as downhole temperature, pressure, characteristics of the subsurface formations (e.g., resistivity, density, porosity), or characteristics of the borehole (e.g., size, shape), for example. The drill string 22 may also include a measurement-while-drilling (MWD) system or a logging-while-drilling (LWD) system. The drill string 22 may also include various forms of transmitters to convey data with the instrument hub 64, for example. Such transmitters may be mud-pulse transmitters, wireless transmitters, wired-drill pipe transmitters, or acoustic transmitters, for example. Although a particular drill string is presented, it should be noted that additional and alternative components may be used in constructing the drill string 22 depending on the environment and operational parameters related to drilling the wellbore. By way of example, the drill string may support vertical drilling operations or directional drilling operations.

The sub 50 may be any of a number of different types of subs including any component of the pipe assembly including the drill string, such as a short drill collar or a thread crossover. The sub 50 and teachings presented herein may be part of a new sub or a retrofitted sub, for example. By way of further example, the sub 50 may be a saver sub, a repeater sub, an interface sub, a sensor sub, a ball valve sub, drilling performance sub (DPS), multiple propagation resistivity (MPR) sub, directional sensor sub (DSS), or hydraulic power control sub, for example. In one embodiment, the sub creates an electrical charge and stores the electrical charge in order to supply electricity to the electronics. As will be discussed hereinbelow, in response to movement of the sub 50, such as rotational, vibrational, or linear movement, the sub 50 generates an electrical current.

Figure 2:
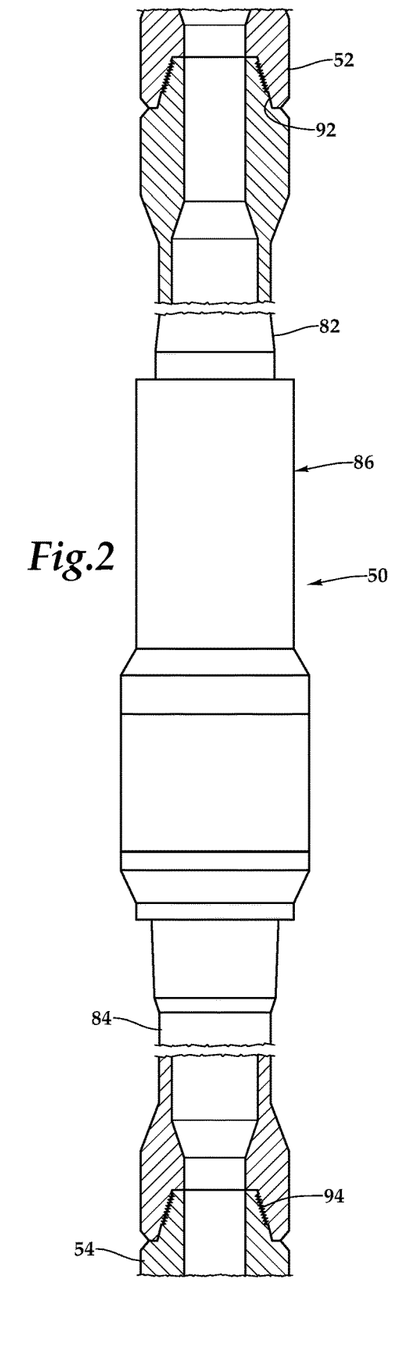
FIG. 2 is a schematic illustration of the pipe assembly including the sub depicted in FIG. 1, according to some embodiments of presented herein.
Figure 3:
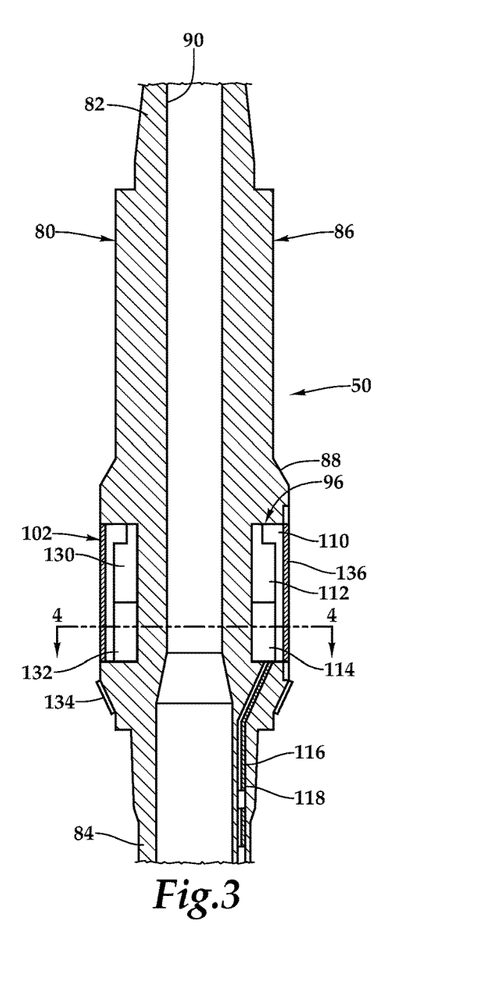
FIG. 3 is a cross-sectional side view of the sub depicted in FIG. 2.
Figure 4:
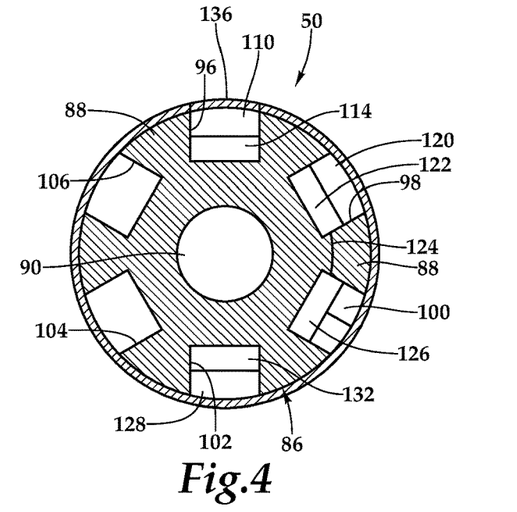
FIG. 4 is a cross-sectional view taken generally along line 3-3 of FIG. 3.

Referring now to FIG. 2, FIG. 3, and FIG. 4, the sub 50 includes a body 80 having an upper end 82 and a lower end 84. A mandrel 86 having a body section 88 includes an internal flow passage 90 that extends generally axially through the mandrel 86 from an upper connection end 92 at the upper end 82 to a lower connection end 94 at the lower end 84. The internal flow passage 90 permits high pressure fluid flow therethrough. Each of the upper connection end 92 and the lower connection end 94 may be appropriately threaded for mating engagement within the pipe assembly and respectively with pipe assemblies 52, 54. Recessed regions 96, 98, 100, 102, 104, 106 are located within the mandrel 86.

With respect to the recessed region 96, a battery charger 110, a battery 112, and electronics shown as sensor 114 are located therein. The battery charger 110 is coupled to the battery 112, which in turn supplies power to the electronics. A passage 116 extends from the recessed region 96 and contains a communication wire 118 that may extend to another portion of the drill string 22 such as pipe assembly 52 via the appropriate coupling. With respect to the recessed region 98, a battery charger 120 and a battery 122 are located therein and electrically coupled. Electronics circuitry 124 connects the battery 122 to sensors 126, which are located within the recessed region 100. With respect to recessed region 102, a battery charger 128, a battery 130, and a sensor 132 are located. The battery charger 128 is coupled to the battery 130, which supplies power to the sensor 132. As shown, transceiver 134 extends from sensor 132.

As further illustrated by the cross-sectional view of FIG. 4, multiple recessed regions 96, 98, 100, 102, 104, 106 may be formed in body section 88 at desired angular positions depending on the configuration and number of components required. Furthermore, in one embodiment, a removable cover 136 may be selectively moved into place over a recessed region, such as the recessed region 96, to protect the components from damage. By way of example, the cover 136 may comprise a cylindrical sleeve with seals that slides into place over the recessed region 96. It should be understood that in other embodiments, the cover utilized to protect the components with the recessed regions 96, 98, 100, 102, 104, 106 is not removable. Further, it should be understood that the number and positions of the recessed regions will vary and variations are within the teachings presented herein. As will be discussed in further detail hereinbelow, rotational, vibrational, and linear motion, for example, of the drill string will create an electric charge in the battery charger which will be stored in the battery and, in turn, used to power the electronics. Moreover, the battery charger presented herein may work with any type of pipe assembly, not just the illustrated drill string.

Figure 5:
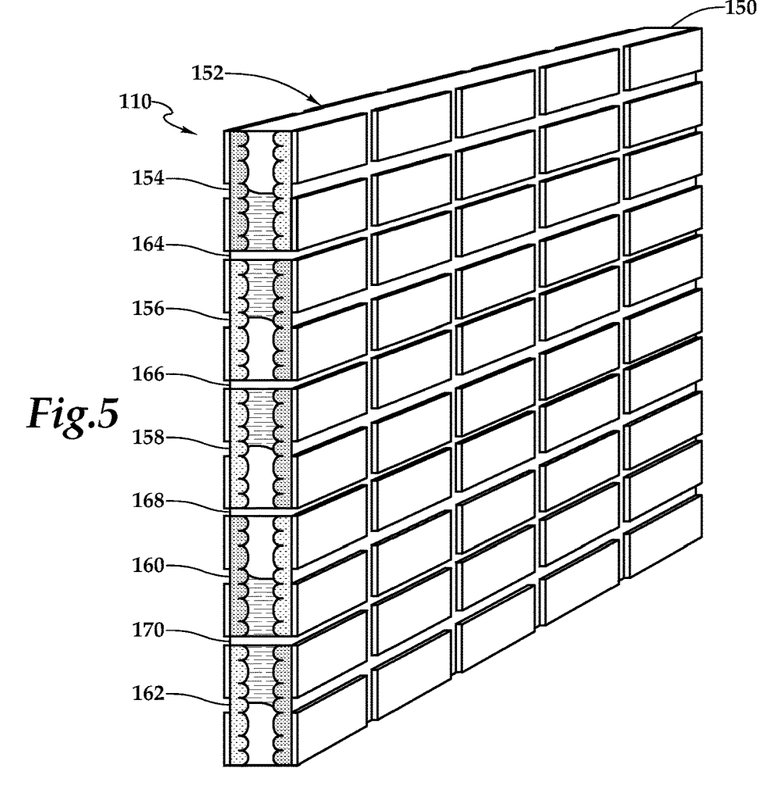
FIG. 5 is a schematic perspective diagram of one embodiment of a battery charger depicted in FIGS. 3 and 4, according to some teachings presented herein.

Referring now to FIG. 5, one embodiment of the battery charger 110 is depicted. A battery charger housing 150 forms a portion of the sub 50 and a liquid triboelectrical generator 152 includes multiple electrostatic energy generators, for example, electrostatic energy generators 154, 156, 158, 160, 162 coupled to electrical circuitry (not shown) and separated by physical separators 164, 166, 168, 170. As will be discussed in further detail hereinbelow, the capacitors utilized in the electrostatic energy generators 154, 156, 158, 160, 162 may be supercapacitors or variable capacitors. The liquid triboelectrical generator 152 utilizes the triboelectric effect in generating an electric charge which may recharge the battery 112, for example, associated with the sub 50.

The triboelectric effect is known as a transfer of charge between two contacting materials, which become electrically charged in opposite signs. Though the triboelectric effect is known for many centuries, its fundamental mechanism is still under investigation. Only recently was it applied in energy harvesting for fabrication of triboelectric generators converting small-scale mechanical energy into electricity that paves the way for simple and low-cost green-energy technology. However, most of the proposed triboelectric generators are limited in efficiency by indispensable requirement for constant change of cavity volume and/or utilization of sliding surfaces. Also these work best only under dry conditions. However, triboelectricity is known to exist when liquids flow through insulators. For example, a voltage variation of 0.3 V was observed upon water flow through a one meter-long millimeter-diameter rubber pipe and surface charge density of over 5 µC/m2 was measured on each water droplet dispensed from a Teflon-coated pipette tip.

The present battery charger 110 may include a design of a liquid triboelectric generator comprising a liquid-filled capacitor or supercapacitor as the key element enabling the increase of the efficiency of generation of electricity. The proposed approach is based on the relation between the electrical charge Q and voltage V and capacitance C:

$$Q=CV \quad \text{[Equation (1)]}$$

Therefore the generated electrical current I (which is the time derivative of the triboelectrical charge) appears to be proportional to the capacitance and its variation in time:

$$I = \frac{dQ}{dt} = C\frac{\partial V}{\partial t} + V\frac{\partial C}{\partial t} \quad \text{[Equation (2)]}$$

where d/dt and ∂/∂t represent total and partial derivative with time correspondingly.

With a supercapacitor which is not fully filled with liquid and separated into more than one individually contacted segments, flow of liquid inside the cavity or series of enclosed chambers causes generation of the triboelectric charge. Therefore the first term in Equation (2) is the variation of the potential across the opposite electrodes owing to the triboelectrically-generated charges, while the second term is the variation of the capacitance due to the local change of capacitance in the segments of the supercapacitor due to the flow of liquid. From Equation (2) one can see that utilization of such triboelectricity-enabled supercapacitor makes it possible to increase the efficiency of triboelectrical generation by a factor of the ratio of electrical capacitance C of the supercapacitor to that of the conventional triboelectrical generator, which can be many orders of magnitude. Supercapacitors are known to feature extremely high capacitance, up to a few kilofarads.

The triboelectricity-enabled, liquid-filled capacitor or supercapacitor may feature the internal volume (cavity) which is only partially filled with liquid, thus enabling for the movement of the liquid inside the cavity. The triboelectricity-enabled supercapacitor also features two or more individually contacted segments that enable the outflow of the electrical charge, which is triboelectrically-generated by the movement of the liquid inside the cavity.

Figures 6, 7, 8, 9:
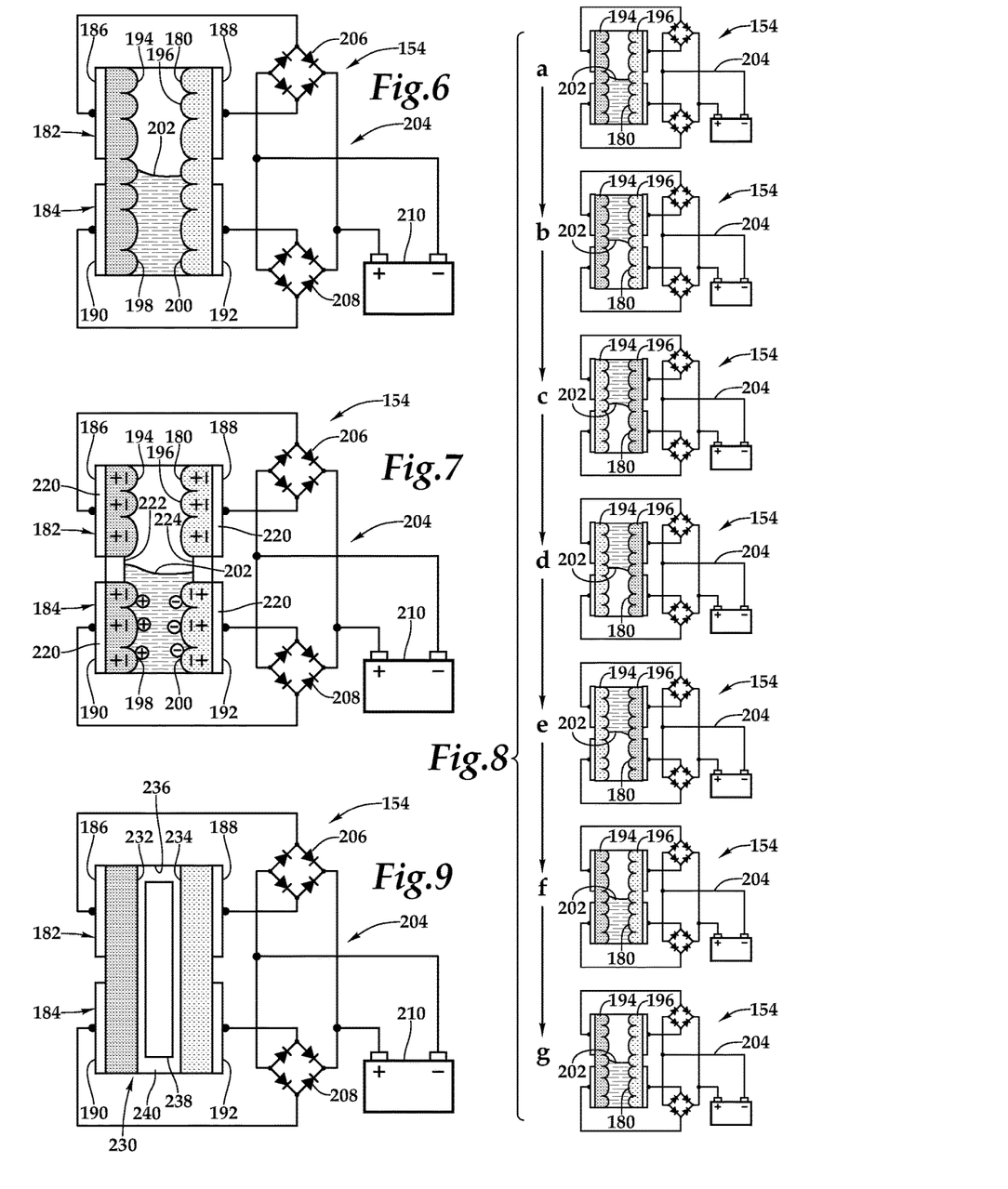
FIG. 6 is a side elevation, in cross section, of one embodiment of an electrostatic energy generator, which forms a portion of the battery charger of FIG. 5, in further detail.
FIG. 7 is a side elevation, in cross section, of another embodiment of the electrostatic energy generator, which forms a portion of the battery charger.
FIG. 8 is a process state diagram depicting one embodiment of the electrical energy generation process, according to some teachings presented herein.
FIG. 9 is a side elevation, in cross section, of a further embodiment of the electrostatic energy generator, which forms a portion of the battery charger.

Referring now to FIG. 6, one embodiment of the electrostatic energy generator 154 is depicted in further detail. As discussed, the battery charger housing 150 is located within the sub. The battery charger housing 150 includes an enclosed chamber 180. A pair of variable capacitors 182, 184 which may be supercapacitors or variable capacitors, are located within the battery charger housing 150 and each of the pair of capacitors 182, 184 includes opposing spaced plates 186, 188, 190, 192 which act as electrodes, having respective contact segments 194, 196, 198, 200 thereon. As shown, in one embodiment, the contact segments 194, 196, 198, 200 form at least a portion of the enclosed chamber 180.

An output power increasing, electrically resistive fluid 202 is held within the enclosed chamber 180 and the output power increasing, electrically resistive fluid 202 partially fills the enclosed chamber 180 such that fluid motion varies the fluid-contact segment contact within the enclosed chamber 180. As will be discussed in further detail hereinbelow, in response to movement of the sub 50, induced relative motion between the output power increasing, electrically resistive fluid 202 and contact segments 194, 196, 198, 200 varies the fluid-contact segment contact within the enclosed chamber 180, thereby inversely alternating the capacitance between the pair of capacitors 182, 184 and triboelectrically generating an electrical charge.

An electronic circuit 204 is coupled to the opposing spaced plates 186, 188, 190, 192 of the pair of variable capacitors. In one embodiment, the electronic circuit 204 may include diode bridges 206, 208 and an electrical accumulator 210. The electronic circuit 204 may be configured to transfer the electrical charge to the battery 112 associated with the sub 50. In one event, the electrical accumulator 210 may be at least partially integrated with the battery 112.

Referring now to FIG. 7, another embodiment of the electrostatic energy generator 154 is depicted. In this embodiment, the plates 186, 188, 190, 192 feature an electret material 220. Electret is a dielectric with a quasi-permanent electric charge or dipole polarization and therefore generates internal and external electric fields. Therefore, utilization of the electret material facilitates generation of the electrical double-layers on the liquid-plate interface (which are crucial for high capacitance of the supercapacitors) without a voltage applied to the electrodes of the triboelectricity-enabled capacitor. Additionally, as shown, the enclosed chamber 180 may include a dielectric material 222, 224 interposed within the contact segments 194, 196, 198, 200 between the opposing spaced plates 186, 188, 190, 192.

Referring now to FIG. 8, a process state diagram depicting one embodiment of the electrical energy generation process is shown. In general, in a fluid inflow cycle, movement of the output power increasing, electrically resistive fluid 202 occurs proximate to the opposing spaced plates 186, 188 such that the output power increasing, electrically resistive fluid 202 is physically occupying the enclosed chamber 180. The output power increasing, electrically resistive fluid 202 inflow cycle causes electrostatic charges with opposite signs to be triboelectrically generated and distributed proximate the opposing spaced plates 186, 188. A temporary electrical circuit is created across the opposing spaced plates 186, 188 thereby generating a voltage/current peak. Thereafter, in a fluid outflow cycle, wherein movement of the output power increasing, electrically resistive fluid 202 moves away from the opposing spaced plates 186, 188 and physically evacuating that portion of the enclosed chamber 180, neutralization of the electrostatic charges occurs. Electrons flow to the electronic circuit 204 until equilibrium is reached between the opposing spaced plates 186, 188.

More specifically, at State (a), which may be the initial state of the triboelectricity-enabled liquid-filled capacitor or supercapacitor, the enclosed chamber 180, which is not fully filled with the output power increasing, electrically resistive fluid 202, includes a pair of capacitors 182, 184 each including the opposing spaced plates 186, 188, 190, 192 having the contact segments 194, 196, 198, 200 thereon. For purposes of illustration, it should be appreciated that with respect to FIG. 8, the process of the triboelectrical generation is described for the contact segments 194, 196 proximate the spaced plates 186, 188. It should be further appreciated that a similar description and process applies to the contact segments 198, 200 proximate the spaced plates 190, 192 as well.

At State (b), with respect to the fluid inflow cycle, with the movement of the output power increasing, electrically resistive fluid 202 inside the enclosed chamber 180, electrostatic charges with opposite signs are triboelectrically generated and distributed on the two internal surfaces of the opposing spaced plates 186, 188 of the supercapacitor segment represented by the opposing spaced plates 186, 188. At State (c), the neutral metal electrodes associated with the opposing spaced plates 186, 188 are charged via the triboelectric effect. At State (d), continuing the fluid inflow cycle, electrons flow across the electrical circuit 204 generating a voltage/current peak. At State (e), a temporary potential equilibrium forms in the supercapacitor segment. Beginning the fluid outflow cycle, at State (f), most of the electrostatic charges on the internal surfaces are neutralized during the fluid outflow process prior to, at State (g), electrons flow back via the electrical circuit 204 until the potential equilibrium forms between the two metal electrodes associated with the opposing spaced plates 186, 188. This enables unidirectional flow of the electrical current out of the triboelectrical generator to the electrical circuit 204, including the electrical accumulator 210 and/or battery 112 to be charged.

In another embodiment, depicted in FIG. 9, the battery charger 110 may be a motion-activated charger 230 for the sub 50 that includes the battery charger housing 150 having contact members 232, 234 defining an inner chamber 236. A moveable element 238 within the battery charger housing co-acts with the contact members 232, 234 of the battery charger housing 150 to generate an electrical charge. This embodiment of the battery charger 110 includes electrical circuitry that is configured to transfer the electrical charge generated to a storage battery. More particularly, in one embodiment, the moveable element 238 may be an output power increasing, electrically resistive object partially filling the enclosed inner chamber 236 such that motion of the moveable element 238 varies the moveable element-contact segment contact within the enclosed inner chamber 236. In response to movement of the sub 50, induced relative motion between the output power increasing, electrically resistive moveable element 238 and contact members 232, 234 varies the moveable element-contact segment contact within the enclosed inner chamber 236, thereby inversely alternating the capacitance between the pair of supercapacitors and triboelectrically generating an electrical charge.

By way of example and not by way of limitation, in the embodiment, the battery charger housing may have dimensions of 82 mm by 110 mm with a 2.20 mm thickness and the inner chamber 116 may have dimensions of 78 mm by 100 mm with a 1.00 mm thickness. It should be appreciated that the shape of the moveable element 238 may vary and, by way of example and not by way of limitation, may include general horizontal shapes or vertical shapes or even irregular shapes. Further, the moveable element 238 may include one or more individual pieces. Therefore, in use, the constant movement of the battery charger housing 150 will create a constant movement of the moveable element 238 that causes friction between the battery charger housing 150 and the moveable element 238 to create the most static electricity possible. It should be further understood that fluid 240 within the enclosed inner chamber 236 about the moveable element 238 may include an electrically resistive fluid, such as output power increasing, electrically resistive fluid 202.

In one implementation, the moveable element 238 is disposed within the enclosed inner chamber 236, which may be the enclosed chamber 180, is an output power increasing, electrically resistive object partially filling the enclosed inner chamber 236 such that motion of the moveable element 238 varies a moveable element-contact segment contact within the enclosed inner chamber 236, thereby inversely alternating the capacitance between the pair of supercapacitors and triboelectrically generating an electrical charge. In an instance of this embodiment, each pair of variable capacitors, which may be represented by contact members 232, 234, are configured for an intake cycle wherein movement of the output power increasing, electrically resistive moveable element 238 proximate to the opposing spaced plates 186, 188, 190, 192 and physically occupying enclosed chamber thereto. The intake cycle causes electrostatic charges with opposite signs to be triboelectrically generated and distributed proximate the opposing spaced plates 186, 188, 190, 192. A temporary electrical circuit created across the opposing spaced plates 186, 188, 190, 192 and generating a voltage/current peak.

Following the output cycle, in an output cycle, movement of the output power increasing, electrically resistive moveable element 238 occurs away from the opposing spaced plates 186, 188, 190, 192 and physically evacuating the enclosed chamber 180. The fluid outflow cycle causes the neutralization of the electrostatic charges and electrons flow via the electrical circuit to the electronic circuit until equilibrium is reached between the opposing spaced plates.

In a further embodiment, a charging system for a battery or batteries with the sub 50 is disclosed that includes the battery charger housing 150 defining an enclosed chamber 180 and a converter contained within the battery charger housing 150 which converts heat to electrical energy. This embodiment of the battery charger 110 also includes electrical circuitry that is configured to transfer the electrical charge generated to a storage battery. The battery charger housing 150 may include a material causing the generation of additional power from heat. Further, various coatings within the battery charger housing 150, inner chamber 236, contact members 232, 234, or moveable element 238 may enhance performance. By way of example and not by way of limitation, the moveable element 238 discussed in FIG. 9, in one embodiment, additionally captures body heat and coverts the heat into electrical energy. This is in addition to the electrostatic charging and triboelectrical generator discussed above.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description.

It is, therefore, intended that the appended claims encompass any such modifications or embodiments.

What is claimed is:

1. A sub for a pipe assembly, the sub comprising:
a mandrel having a body section including an internal flow passage that extends generally axially through the mandrel from an upper connection end to a lower connection end;
a recessed region within the mandrel;
a battery charger including an enclosed chamber, the battery charger being disposed in the recessed region;
a pair of capacitors located within the battery charger, each of the pair of capacitors including opposing spaced plates having contact segments thereon, the opposing spaced plates including electret;
an output power increasing, electrically resistive fluid held within the enclosed chamber, the output power increasing, electrically resistive fluid partially filling the enclosed chamber such that a fluid motion varies a fluid-contact segment contact within the enclosed chamber;
in response to a movement of the sub, an induced relative motion between the output power increasing, electrically resistive fluid and contact segments varies the fluid-contact segment contact within the enclosed chamber, thereby inversely alternating the capacitance between the pair of capacitors and triboelectrically generating an electrical charge;
an electronic circuit coupled to the opposing spaced plates of the pair of capacitors, the electronic circuit configured to transfer the electrical charge to a battery associated with the mandrel; and
a moveable element disposed within the enclosed chamber, the moveable element being an output power increasing, electrically resistive object partially filling the enclosed chamber such that motion of the moveable element varies a moveable element-contact segment contact within the enclosed chamber, thereby inversely alternating the capacitance between the pair of capacitors and triboelectrically generating the electrical charge.

2. The sub as recited in claim 1, wherein the contact segments form at least a portion of the enclosed chamber.

3. The sub as recited in claim 1, wherein a kinetic motion of the sub causes a physical displacement of the output power increasing, electrically resistive fluid relative to the pair of capacitors.

4. The sub as recited in claim 1, wherein the upper connection end and the lower connection end are configured to connect to a drill string.

5. The sub as recited in claim 1, wherein a rotational, kinetic motion of the sub during a drilling operation causes a physical displacement of the output power increasing, electrically resistive fluid relative to the pair of capacitors.

6. The sub as recited in claim 1, wherein the battery is located in the recessed region.

7. The sub as recited in claim 6, further comprising electronics coupled to the battery, the electronics being located in the recessed region.

8. The sub as recited in claim 6, further comprising an antenna located in the mandrel, the antenna being coupled to the electronics.

9. The sub as recited in claim 6, wherein the mandrel further comprises conductors that electronically connect the electronics to a wired pipe of the pipe assembly.

10. The sub as recited in claim 1, wherein the mandrel further comprises a plurality of recessed regions.

11. The sub as recited in claim 10, wherein the battery is located in one of the plurality of the recessed region.

12. The sub as recited in claim 11, further comprising electronics coupled to the battery, the electronics being located in one of the plurality of the recessed regions.

13. The sub as recited in claim 12, further comprising an antenna located in the mandrel, the antenna being coupled to the electronics.

14. The sub as recited in claim 12, wherein the mandrel further comprises conductors that electronically connect the electronics to a wired pipe of the pipe assembly.

15. The sub as recited in claim 1, wherein the opposing spaced plates further comprise an electret material, the opposing spaced plates generating an internal electric field about the contact segments and an external electric field about the enclosed chamber, thereby enhancing the electrical charge generated through the tribolelectricity.

16. The sub as recited in claim 1, wherein the enclosed chamber further comprises dielectric material interposed within the contact segments between the opposing spaced plates.

17. The sub as recited in claim 1, wherein each of the pair of variable capacitors being configured for:
a fluid inflow cycle wherein a movement of the output power increasing, electrically resistive fluid proximate to the opposing spaced plates and physically occupying the enclosed chamber thereto occurs;
the fluid inflow cycle causing electrostatic charges with opposite signs to be triboelectrically generated and distributed proximate the opposing spaced plates;
a temporary electrical circuit being created across the opposing spaced plates and generating a voltage/current peak;
a fluid outflow cycle wherein a movement of the output power increasing, electrically resistive fluid away from the opposing spaced plates and physically evacuating the enclosed chamber occurs;
the fluid outflow cycle causing a neutralization of the electrostatic charges; and
electrons flowing via the electrical circuit to the electronic circuit until an equilibrium is reached between the opposing spaced plates.

18. The sub as recited in claim 1, wherein each of the pair of capacitors are configured for:
an intake cycle wherein a movement of the output power increasing, electrically resistive moveable element proximate to the opposing spaced plates and physically occupying the enclosed chamber thereto occurs;
the intake cycle causing electrostatic charges with opposite signs to be triboelectrically generated and distributed proximate the opposing spaced plates;
a temporary electrical circuit being created across the opposing spaced plates and generating a voltage/current peak;
an output cycle wherein a movement of the output power increasing, electrically resistive moveable element away from the opposing spaced plates and physically evacuating the enclosed chamber occurs;
the fluid outflow cycle causing the neutralization of the electrostatic charges; and
electrons flowing via the electrical circuit to the electronic circuit until an equilibrium is reached between the opposing spaced plates.

19. A sub for a pipe assembly, the sub comprising:
a mandrel having a body section including an internal flow passage that extends generally axially through the mandrel from an upper connection end to a lower connection end, each of the upper connection end and the lower connection end configured to connect to a drill string;

a recessed region within the mandrel;

a battery charger including an enclosed chamber, the battery charger being disposed in the recessed region;

a pair of capacitors located within the battery charger, each of the pair of capacitors including opposing spaced plates having contact segments thereon, the opposing spaced plates including electret;

an output power increasing, electrically resistive fluid held within the enclosed chamber, the output power increasing, electrically resistive fluid partially filling the enclosed chamber such that a fluid motion varies a fluid-contact segment contact within the enclosed chamber;

in response to a rotational movement of the sub during a drilling operation, an induced relative motion between the output power increasing, electrically resistive fluid and contact segments varies the fluid-contact segment contact within the enclosed chamber, thereby inversely alternating the capacitance between the pair of capacitors and triboelectrically generating an electrical charge;

an electronic circuit coupled to the opposing spaced plates of the pair of capacitors, the electronic circuit configured to transfer the electrical charge to a battery associated with the mandrel.

* * * * *